(No Model.)
H. C. RASNER & A. WALTON.
GEAR MOLDING DEVICE.
No. 284,327. Patented Sept. 4, 1883.
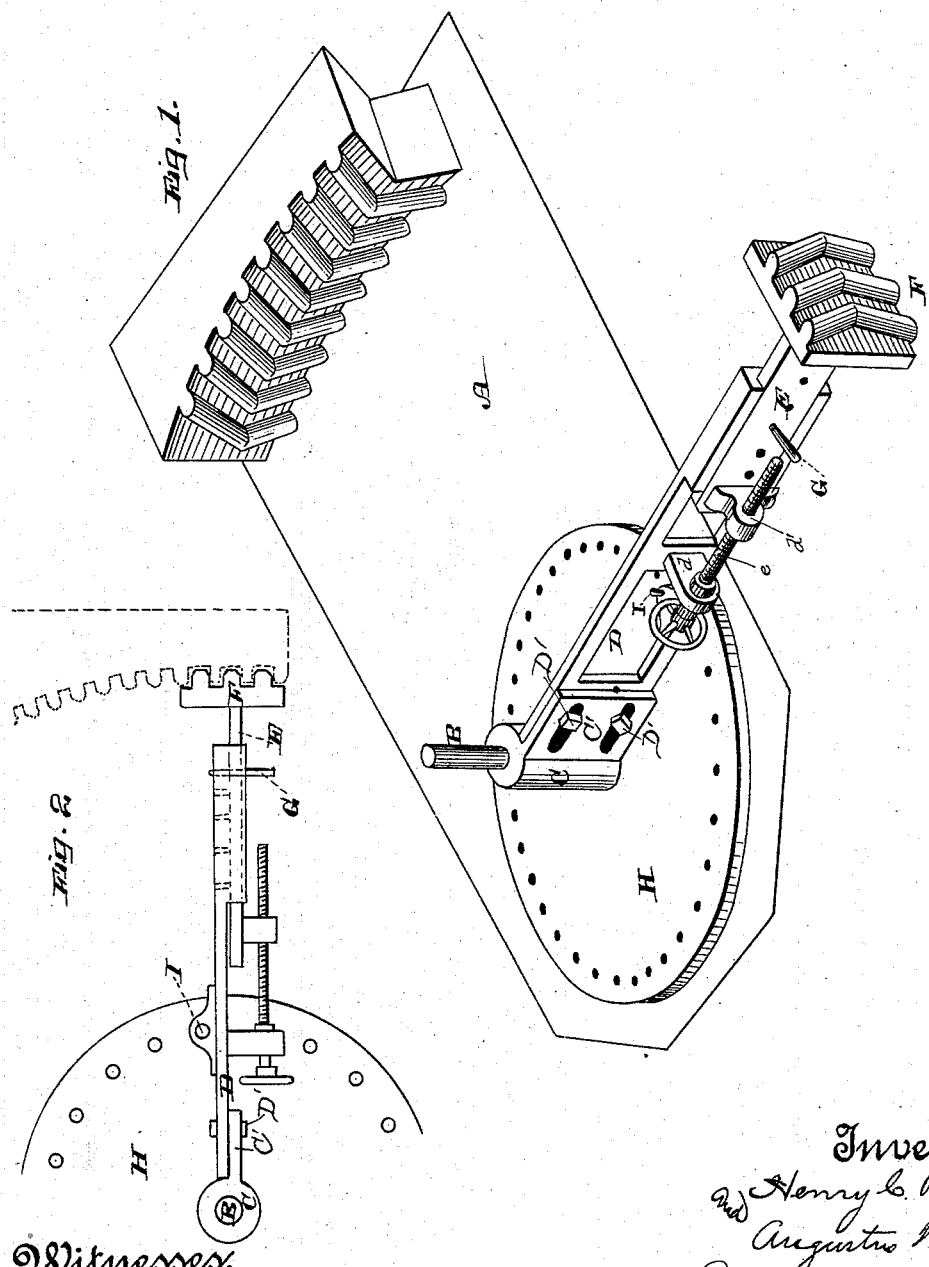
Witnesses:
Geo. H. Strong.
J. H. Truman.
Inventors,
Henry C. Rasner
Augustus Walton
By Dewey & Co.
Attorneys

United States Patent Office.

HENRY C. RASNER AND AUGUSTUS WALTON, OF SAN FRANCISCO, CAL.

GEAR-MOLDING DEVICE.

SPECIFICATION forming part of Letters Patent No. 284,327, dated September 4, 1883.

Application filed March 19, 1883. (No model.)

*To all whom it may concern:*

Be it known that we, HENRY C. RASNER and AUGUSTUS WALTON, of the city and county of San Francisco, State of California, have invented an Improved Gear-Molding Device; and we hereby declare the following to be a full, clear, and exact description thereof.

Our invention relates to an improved device to be used in molding gears of every description, and especially large work and patterns, which are difficult to draw; and it consists of one or more radial arms extending outward from a common center, and having one or more teeth of the pattern so connected with their outer ends that they may be advanced or withdrawn in a radial line, together with means for moving and adjusting the parts, all of which will be more fully explained by reference to the accompanying drawings, in which—

Figure 1 is a perspective view of our device. Fig. 2 is a top view.

A is the bed of the mold, and B is a vertical central spindle, around which the hub C and arms C' D turn. One or more of these arms C' D project horizontally from this hub, and have extensions E moving in guides upon their outer ends, so that they (the extensions) may be moved outwardly or inwardly in a radial line. Upon the outer end of each of these movable extensions E is supported a section, F, of the pattern of the gear or other article which is to be formed. The extension E is moved by a screw, e, engaging a thread in lug d', but turning loosely in lug d on arm D, by which a steady movement can be given to it; and it may have gage-marks and a pin, G, or other means for holding it in adjustment, and to give this adjustment more nicety. Around the central shaft or spindle is a disk or plate, H, having its periphery divided to correspond with the teeth or divisions to be made in the circumference of the mold, and a pin or other device, I, holds the arms C' D and the extension after each movement to a new section.

The operation will then be as follows: The bed of the mold having been prepared and the parts in place, the sand is built up and tamped against the outside of the pattern, and when this has been finished the extension is loosened and drawn back toward the center until the pattern is free from the sand. The arms C' D, with the extension, are then moved around far enough to form a new section of the rim, and the extension is advanced to the proper position and fixed, the next section being built up in a similar manner, and so on until the whole has been completed.

This device enables us to form molds for intricate patterns, and those which it would be impossible to make in sand, such as gears having teeth inclined toward the center of the face from opposite edges, and other similar work.

The arms C' D are preferably made in two parts, the outer one sliding upon the inner one, and the two secured by bolts D', as shown, so that the apparatus may be adjusted to make different sizes of wheels.

Different forms of teeth or patterns may also be fixed upon this extension, if desired, to suit the work to be done.

Having thus described our invention, what we claim as new, and desire to secure by Letters Patent, is—

1. In a gear-molding machine, and in combination with a stationary bed and a central hub, C, one or more arms, C' D, projecting from said hub, and having a worm or screw and locking device, with extensions E fixed at the other end of the arms and carrying toothed patterns, as set forth.

2. In a gear-molding machine, a stationary bed, A, and a hub, C, with a vertical axis, B, an arm or arms, C' D, extending outward from said hub, an extension, E, to which a pattern is attached, a worm or screw connected with the arms C' D, so as to advance or withdraw said extension, and a lock by which this extension is gaged, in combination with a central graduated disk, H, fixed with relation to the arms so as to gage the distance to which the pattern is moved circumferentially for each new operation, as set forth.

In witness whereof we hereunto set our hands.

HENRY C. RASNER.
AUGUSTUS WALTON.

Witnesses:
S. H. NOURSE,
J. H. BLOOD.